(12) United States Patent
Balasubramanian et al.

(10) Patent No.: US 9,100,210 B2
(45) Date of Patent: Aug. 4, 2015

(54) REDUNDANT GATEWAY SYSTEM FOR DEVICE LEVEL RING NETWORKS

(75) Inventors: Sivaram Balasubramanian, Solon, OH (US); Anatoly Moldovansky, Pepper Pike, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 402 days.

(21) Appl. No.: 13/296,872

(22) Filed: Nov. 15, 2011

(65) Prior Publication Data

US 2013/0121158 A1 May 16, 2013

(51) Int. Cl.
*H04L 12/437* (2006.01)
*H04L 12/44* (2006.01)
*H04L 12/66* (2006.01)

(52) U.S. Cl.
CPC .............. *H04L 12/437* (2013.01); *H04L 12/44* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 5,333,270 A | 7/1994 | Brief et al. | |
| 6,658,013 B1 * | 12/2003 | de Boer et al. | 370/404 |
| 7,379,429 B1 | 5/2008 | Thottakkara | |
| 7,551,569 B2 * | 6/2009 | Vasseur | 370/252 |
| 7,602,706 B1 * | 10/2009 | Gardo et al. | 370/219 |
| 7,817,538 B2 | 10/2010 | Balasubramanian et al. | |
| 8,284,658 B2 * | 10/2012 | Kulkarni et al. | 370/228 |
| 8,355,348 B1 * | 1/2013 | Miller et al. | 370/256 |
| 2007/0258359 A1 * | 11/2007 | Ogasawara et al. | 370/218 |
| 2008/0025203 A1 * | 1/2008 | Tallet | 370/216 |
| 2008/0107416 A1 * | 5/2008 | Wang | 398/59 |
| 2009/0207726 A1 * | 8/2009 | Thomson et al. | 370/216 |
| 2010/0188972 A1 | 7/2010 | Knapp | |
| 2010/0246385 A1 | 9/2010 | Balasubramanian et al. | |
| 2012/0243442 A1 * | 9/2012 | Musku et al. | 370/256 |

OTHER PUBLICATIONS

Extended European Search Report dated Feb. 14, 2013; Application No. 12192794.1—(5 pages).

* cited by examiner

*Primary Examiner* — Gregory Sefcheck
*Assistant Examiner* — Daniel Mitchell
(74) *Attorney, Agent, or Firm* — Boyle Friedrickson, S.C.

(57) ABSTRACT

Multiple gateway devices communicating between a device level ring (DLR) network and a spanning tree (ST) network may be provided a gateway protocol that cooperatively ensures that only a single gateway is active at a given time. This cooperation may be effected by the transmission of advertise messages by gateways, the advertise messages holding precedence values so that only a single gateway having a highest precedence value is active at a given time. Loss of the advertise messages may trigger a gateway held in a backup state to assume an active gateway role.

18 Claims, 3 Drawing Sheets

REDUNDANT GATEWAY SYSTEM FOR DEVICE LEVEL RING NETWORKS

BACKGROUND OF THE INVENTION

The present invention relates to data networks suitable for industrial control and in particular to gateways communicating between a spanning tree (ST) network and device level ring (DLR) network.

Networks used for communication among industrial controllers differ from standard networks in that they must operate to communicate data reliably and within predefined time limits among network devices that control equipment. A bounded response time may be provided by communication protocols that reserve network bandwidth and schedule messages. Network reliability may be provided by the introduction of redundant network components.

Many computer networks provide for automatic "repair" of the network in the event of network device failure by switching between redundant components. These protocols can take a relatively long time to reconnect the network (as much as 30 seconds) and thus are unacceptable for industrial control networks where the controlled process often cannot be undirected during this period without serious consequences.

High-speed correction for network failure in an industrial control environment can be obtained by connecting network devices in a device level ring (DLR) where the ring network topology presents redundant paths (along the ring in two opposite directions) between any two devices. Normally the ring is "open" at a supervisor device for all standard data and thus operates in a normal linear topology for most data messages. The supervisor may send out "beacon" frames in both directions on the ring on different ports which are received back at the opposite port to indicate the integrity of the ring. If the ring is broken by device or media failure outside of the supervisor, the supervisor rejoins the ends of the ring at the supervisor to restore a continuous linear topology with the ring now separated by the failed component rather than the supervisor. Changes in the state of operation of the supervisor from "separated" to "joined" may be transmitted to the other nodes using notification frames so that these nodes can rebuild their MAC address routing tables used to associate a port with a destination address.

The error detection time of such ring systems can be quite fast, limited principally by the transmission rate of the beacons (every several microseconds). This rate defines the maximum time before which an error is detected and the ring may be reconfigured.

It is often desired to connect a DLR network with other networks, for example, those associated with devices that do not require the benefits of the DLR network topology. Such networks may permit a more flexible device interconnection, facilitated by a "spanning tree protocol" (STP) that detects and eliminates possible "loops" in connections between devices, such loops which otherwise might permit messages to pass indefinitely in circles through the network. As is understood in the art, spanning tree protocols identify loops in a network built with infrastructure devices called bridges, and provide instructions to bridges to block certain ports to eliminate these network loops. These instructions are transmitted as "bridge protocol data units" (BPDUs) to the various bridges in the network.

The loop structure of a DLR can be incompatible with a spanning tree (ST) type network, which attempts to eliminate loops. This incompatibility may be accommodated when providing a gateway between a DLR and ST type network by ensuring that each given DLR network has only a single gateway. This limitation to the number of gateways, however, increases the risk that a single gateway failure will prevent communication between the two networks.

SUMMARY OF THE INVENTION

The present invention provides a system to permit redundant gateways between DLR and ST networks through a protocol ensuring that only one of multiple gateways in a DLR network may be active at one time. Generally, the gateways operate in either an active or a backup state, operating in the active state to permit connection of the DLR and ST networks through the gateway, and operating in the backup state to largely separate DLR traffic on one side of the gateway and ST traffic on the other side. Broadcast "advertise" messages, containing a precedence value, may be used to communicate among gateways to hold one gateway in an active state (having the highest precedence) and the other gateways in a backup state. Loss of the "advertise" message or explicit fault transmission causes a switchover between devices.

Specifically, the present invention provides, in one embodiment, a gateway for connecting a device level ring (DLR) network to a spanning tree (ST) network. The gateway includes a first and second port connectable to devices in a DLR network to communicate DLR topology messages and general messages with other devices connected in the DLR network, the DLR topology messages controlling reconfiguration of the DLR in the event of a break in the DLR ring. The gateway also includes at least one third port connectable to devices in the ST network to communicate general messages with other devices connected in the ST network. A controller in the gateway communicates with the first, second, and third ports to operate in at least two states including an active state and a backup state where the gateway: (i) exchanges DLR topology messages only with other devices in the DLR network in the active and the backup states; (ii) exchanges general messages among devices in the ST network in the active and the backup states; and (iii) exchanges general messages between devices in the DLR network and devices the ST network only in the active state.

It is thus a feature of at least one embodiment of the invention to provide redundancy in gateways between DLR and ST type networks without the conflicts that can occur in these two different network types, for example, spanning tree algorithms attempting to break the loop of the DLR network.

The gateway may further monitor the DLR network to switch between the active and backup state based on messages from another gateway in the DLR network so that there is only one active gateway in the DLR network.

It is thus a feature of at least one embodiment of the invention to provide an automatic configuration of redundant gateways between a DLR network and ST type network. By monitoring messages on the DLR network, the redundant gateways may self-organize so that only one gateway is active at a time and so that in the event of failure of a gateway, another gateway activates itself.

The gateway may transmit advertise messages providing a precedence value unique to the gateway in the active state and listen for advertise messages in the backup state, and may switch from the backup state to the active state if advertise messages are not received during a predetermined time or are received with a lower precedence than the precedence value unique to the gateway.

It is thus a feature of at least one embodiment of the invention to make use of the DLR network itself for organizing the multiple gateways.

The precedence value may include a stored value set by a user and a MAC address of the gateway.

It is a feature of at least one embodiment of the invention to eliminate the possibility of precedence "ties" when identifying a new gateway by using the unique MAC address as a tie-breaker.

The gateway states may include a listen state and a backup state, and the gateway may switch from the listen state to the backup state if advertise messages are received with a higher precedence than the precedence value unique to the gateway and may switch from the backup state to the listen state if advertise messages are not received during a predetermined time or are received with a fault indication; and wherein the gateway transmits advertise messages in the listen state and not in the backup state.

It is thus an object of at least one embodiment of the invention to permit the transmission of advertise messages from gateways performing a backup function without transmitting unnecessary advertise messages at all times during the backup function.

The gateway may transmit a broadcast flush tables message to other devices on the DLR network causing them to relearn associations between addresses and ports when the gateway switches to the active state. The flush tables message may trigger transmission of a broadcast learning update message by the devices on the DLR network to the bridges on the ST network and to the other devices on the DLR network causing them to rapidly relearn associations between addresses and ports when the gateway switches to the active state.

It is thus an object of a least one embodiment of the invention to provide a state change that may be used to trigger a learning update message to rapidly relearn the network topology on both sides of the gateway.

These particular features and advantages may apply to only some embodiments falling within the claims and thus do not define the scope of the invention.

DETAILED DESCRIPTION OF THE PREFERRED EMBODIMENT

Figure 1:
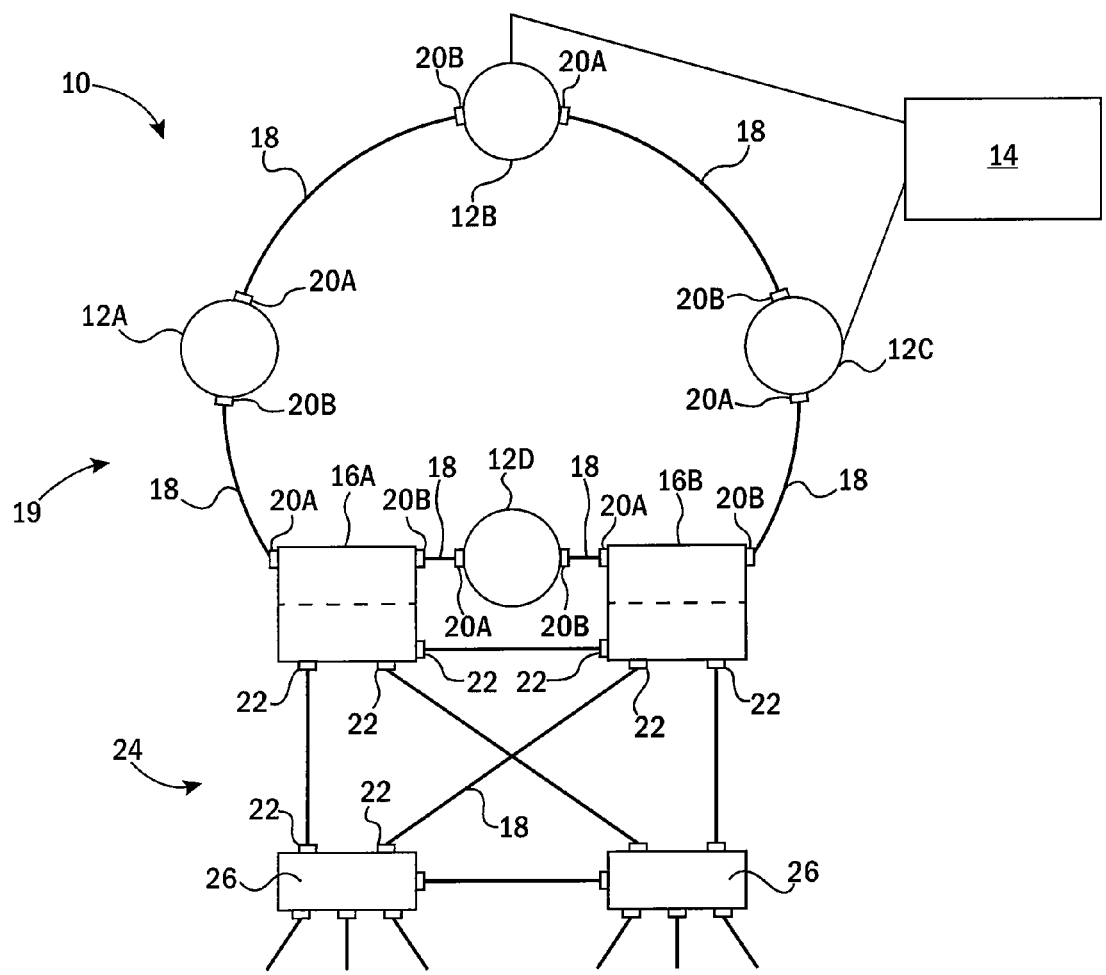
FIG. 1 is a diagram of an industrial control network configured as a device level ring (DLR) network and incorporating two gateway devices for communicating between the DLR network and a spanning tree (ST) network for exchange of data therebetween.

Referring now to FIG. 1, an industrial control network 10 may include, for example, multiple control devices 12a-d such as may exchange signals directly or indirectly with an industrial process 14 for real-time control of that process. Real-time control, in this context, means control that is subject to well-defined maximum delay periods between an output signal generated by the control device 12 and an electrical signal sent to an actuator in the industrial process 14, and similarly well-defined maximum delay periods between the generation of a signal by a sensor in the industrial process 14 and its receipt and processing by a control device 12.

The control devices 12 may communicate with each other and with first and second gateway devices 16a and 16b by means of network media 18 supporting an industrial control network protocol to implement a full duplex IEEE 802.3 Ethernet network.

The control devices 12 may provide the functionality of the programmable logic controller, a motor drive, an I/O module or the like and may include an electronic computer executing a stored program held in memory and providing logic for the necessary control. Often the stored program is generated uniquely for the particular industrial process 14. The control devices 12 will also include standard network communication interfaces compatible with the protocol described above.

Improved tolerance to network fault (being either the loss of a device 12 or network media 18) may be obtained by arranging the devices 12a-12d and gateways 16a-16b in a device level ring (DLR) network 19 wherein each device 12 and gateway 16 communicates with two other devices 12 or gateways 16 that flank it in the ring. Thus, for example, each given device 12 or gateway 16 may have a first and second DLR port 20a and 20b communicating via network media 18 with one device in a clockwise direction (e.g., port 20a of the given device communicating with port 20b of a clockwise flanking device) and with a one device in the counterclockwise direction (port 20b of the given device communicating with port 20a of the counterclockwise flanking device). A DLR network 19 suitable for use with the present invention is described, for example, in U.S. patent application Ser. No. 12/493,838 filed Jun. 29, 2009, assigned to the assignee of the present invention and hereby incorporated by reference.

Each gateway 16a and 16b may also include multiple standard ports 22 that may connect to a standard, spanning tree (ST) network 24. The ST network 24 may include multiple bridges 26 connected by network media 18 to permissibly create multiple physical loops and redundant interconnections between the gateways 16 and bridges 26. The particular spanning tree protocol implemented by the spanning tree network 24 may follow IEEE 802.1D "rapid spanning tree protocol" (RSTP) or IEEE 802.1Q "multiple spanning tree protocol" (MSTP) or other similar standards.

Figure 2:
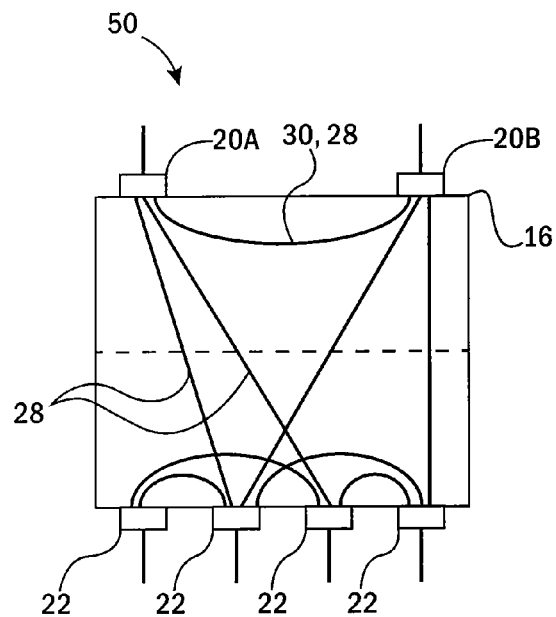
FIG. 2 is a block diagram of the one of the gateway devices of FIG. 1 in an active state.
Figure 3:
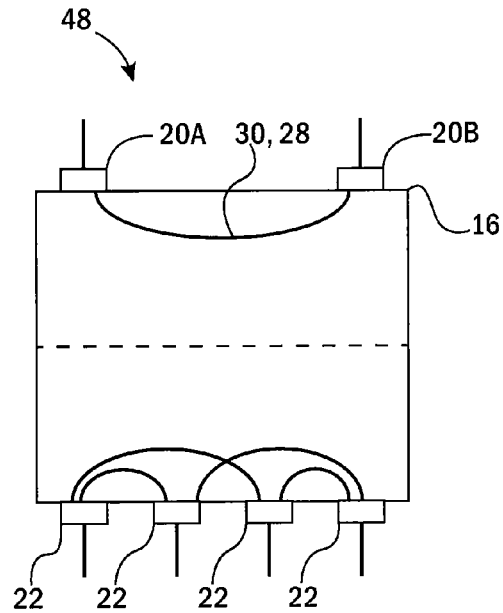
FIG. 3 is a block of another of the gateway devices of FIG. 1 in a backup state.

Referring now to FIGS. 2 and 3, each of the gateways 16a and 16b may operate in an active state 50 as shown in FIG. 2 or a backup state 48 as shown in FIG. 3. In the active state 50, general messages 28 may be transmitted between ports 20a and/or 20b and all other ports including ports 22, for example, using common Ethernet protocols. Such general messages 28 exclude only DLR topology messages 30 which relate to reconfiguration of the topology of the DLR network 19 as may be transmitted from a supervisory node, as will be discussed below, and as is disclosed in the prior application cited above. In the active state 50, DLR topology messages 30 may be transmitted only between ports 20a and 20b. General messages 28 may also include "bridge protocol data units" (BPDUs) from the spanning tree network 24 which may be communicated into the DLR network 19 which in normal operation will have no bridging loops because the logical loop of the DLR network 19 is broken either by a supervisory node or by a failure in the loop.

Referring to FIG. 3, in the backup state 48, general messages 28 from either of ports 20a or 20b may be transmitted only to the other of the ports 20a and 20b in the manner of the DLR topology messages 30. Likewise general messages and other messages from the spanning tree ports 22 may only be transmitted to other spanning tree ports 22. General messages are blocked from transmission between ports 20 and ports 22.

Figure 4:
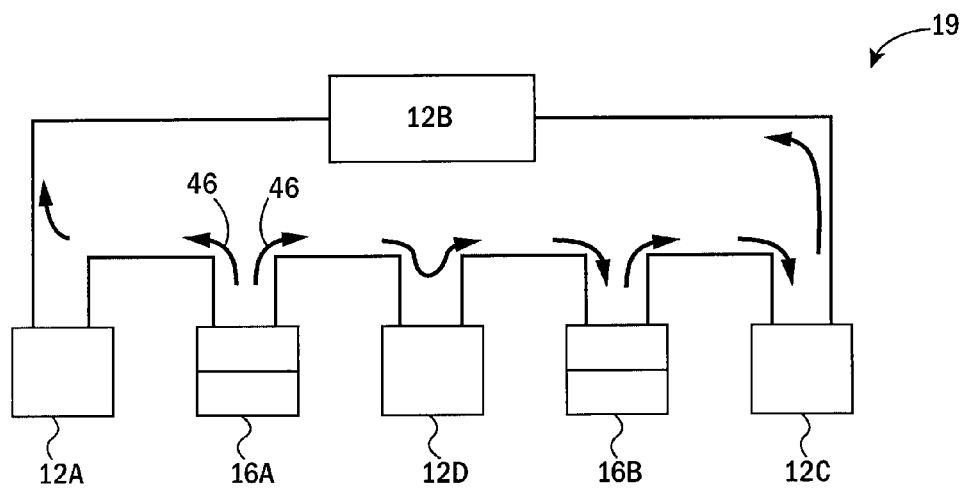
FIG. 4 is a simplified diagram of the DLR network of FIG. 1 showing transmission of advertise messages from one gateway in an active or listen state used to enforce a single gateway operation.
Figure 5:
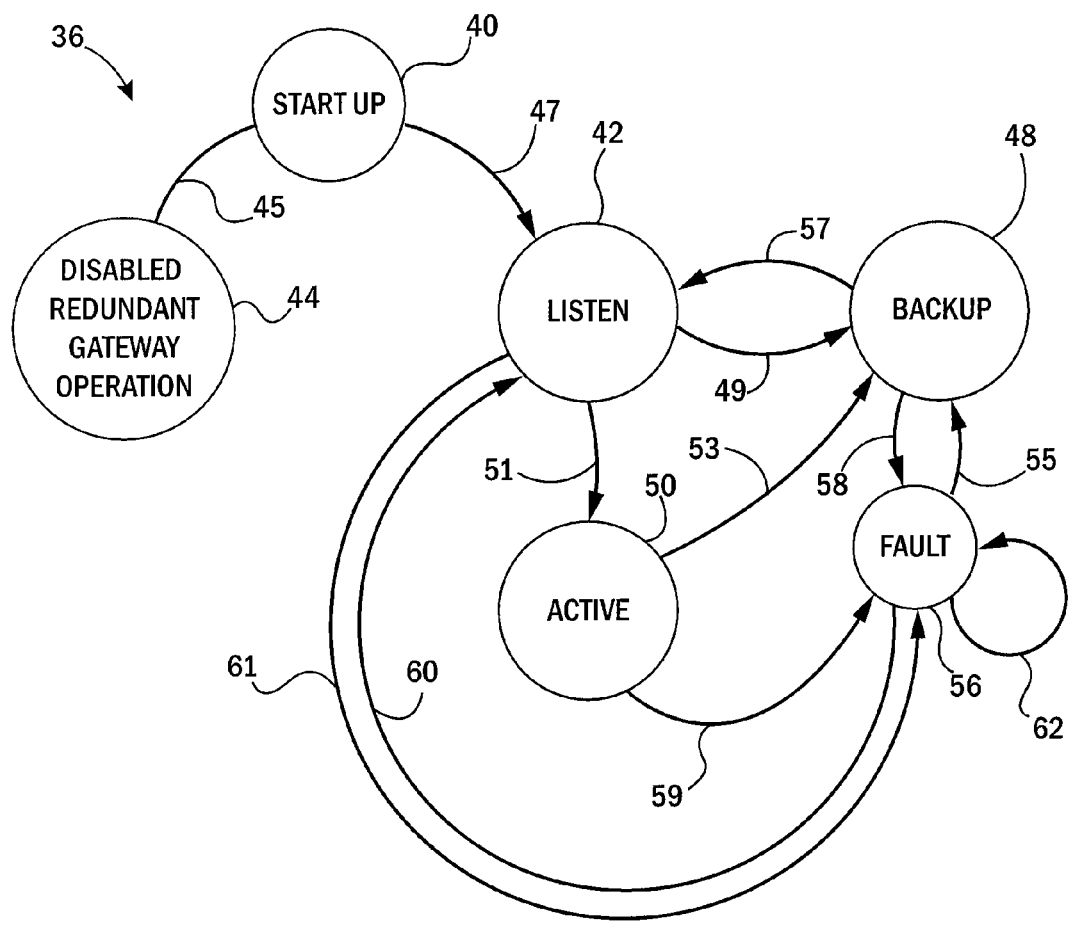
FIG. 5 is a state diagram of the operation of the gateways according to the present invention.

Referring now to FIGS. 4 and 5, each gateway 16 may have software or firmware providing a stored program 36 providing coordination between the gateways 16 on the DLR network 19. When power is first applied to a given gateway 16a, for example, the given gateway 16a starts in a startup state 40 where traffic forwarding between ports 20 and 22 is blocked. If redundant gateway operation for the given gateway 16a is disabled, the program proceeds to single gateway node 44 per state transition arrow 45 and traffic is enabled between ports 20 and 22.

Alternatively, if redundant gateway operation is enabled for the given gateway 16a, for example by user command programmed into the gateway 16a, the program 36 proceeds to listen state 42 per state transition arrow 47 while continuing to block transmissions between ports 20 and 22.

At listen state 42, the gateway 16a will transmit an advertise message 46 on the DLR network 19 (advertise messages shown for only gateway 16a in FIG. 4 for clarity). The gateway 16a will also listen for advertise messages from other gateways (e.g. gateway 16b). The advertise messages 46 incorporate a precedence value that may be programmed into the gateway 16a by the user and also incorporate elements of the MAC address of the gateway 16a on the DLR network 19. The advertise message 46 will also provide the state of the transmitting device, for example, as indicated by the listen state 42 or the active state 50 to be described below.

If, at the listen state 42, an advertise message 46 is received from another gateway 16b having a higher precedence value than that of the gateway 16a receiving the advertise message, the gateway 16a moves to a backup state 48 per state transition arrow 49. As noted above, the precedence value includes a programmed portion and the MAC address of the gateway 16. If the programmed portion of the precedence value of the received advertise message 46 is identical to the programmed portion of the precedence value of the receiving gateway 16a (for example by erroneous duplicate programming), the MAC address of the two gateways 16a and 16b are compared and the MAC address is used as a tiebreaker. That is, if the MAC address of the transmitting gateway 16b is numerically greater than the MAC address of the receiving gateway 16a, the receiving gateway 16a will transition to the backup state 48 per state transition arrow 49.

In the backup state 48 traffic forwarding from ports 20 to 22 is blocked and the gateway 16a will stop transmission of advertise messages 46 preventing unnecessary use of network bandwidth.

If at the listen state 42 no advertise message 46 is received within a predetermined time out period or if an advertise message is received with a lower precedence value, the program 36 will proceed to the active state 50 per state transition arrow 51 and will become an active gateway device with traffic forwarding from ports 20 to 22 and vice versa.

Upon transition to the active state 50, the gateway 16a will transmit an advertise message 46 and will continue to transmit advertise messages 46 on a regular basis while in the active state 50. In addition, immediately upon transition to the active state 50, the gateway 16a will transmit a broadcast "flush tables" message to all DLR devices 12 and will flush its own unicast and multicast address learning filter tables (routing tables). The gateway 16a at this time will send a broadcast learning update frame to the non-DLR bridges 26 and to other DLR devices 12 to accelerate their learning. Upon receiving "flush tables" message, a DLR device 12 will flush its own unicast and multicast address learning filter tables (routing tables) and will send a broadcast learning update frame to the non-DLR bridges 26 and to other DLR devices 12 to accelerate their learning.

While the gateway 16a is in the active state 50, it continues to monitor the DLR network 19 for advertise messages 46. If an advertise message 46 is received from another gateway 16b with a higher precedence (as described above) the given receiving gateway 16a will transition to the backup state 48 per state transition arrow 53.

While the program 36 is in the backup state 48, if physical connection is lost on all the uplink ports 22 of the gateway 16a or higher level connection fault is detected on the ports 22, the gateway 16a will transition to the fault state 56 as indicated by state transition arrow 58. In the fault state 56, forwarding of traffic between ports 20 and 22 will be blocked and no advertise messages 46 will be transmitted; however, the fault will continue to be monitored.

Alternatively, while the gateway 16a is in the active state 50 or listen state 42, if physical connection is lost on all the uplink ports 22 or higher level connection fault is detected on the ports 22, the gateway 16a will transmit an advertise message 46 denoting a fault state 56 and will transition to the fault state 56 per state transition arrow 59 or state transition arrow 61 as appropriate, again blocking traffic between the ports 20 and the ports 22 and ceasing transmission of the advertise message 46 in the fault state 56.

While in the backup state 48, if an advertise message 46 is received from a gateway 16b denoting a fault state or if advertise messages 46 are not received from an active gateway 16b for predetermined time out period, the gateway 16a will move to the listen state 42 as indicated by state transition arrow 57. As before in this listen state 42, traffic is blocked between ports 20 and 22.

While the gateway 16a is in the fault state 56, it continues to monitor the advertise messages 46 and if the connection on ports 22 is restored and the advertise messages 46 indicate an active gateway 16b having a precedence greater than the receiving gateway 16a, the program 36 transitions to the backup state 48 as indicated by state transition arrow 55. Alternatively, if the connection on ports 22 is restored and the received advertise messages 46 are from a gateway 16b having a lower precedence than the receiving gateway 16a, the program 36 transitions from the fault state 56 to the listen state 42 as indicated by state transition arrow 60. The gateway 16a stays in the fault state 56 per state transition arrow 62, if the advertise messages 46 are not received from an active gateway 16b for predetermined time out period and the connection on ports 22 is still not restored.

It is possible for partial network fault to occur so that data traffic is lost in only one direction on a given section of network medium 18 suggesting to a gateway 16a that an active higher precedence gateway 16b device is lost when in fact it is simply a failure of the network medium 18. To prevent multiple gateways 16 from being enabled in this situation a gateway 16a in active state 50 that receives advertise messages 46 from a gateway 16 in the active state 50 but having a lower precedence will block traffic forwarding from ports 20 to 22 until this condition is cleared by the user.

Certain terminology is used herein for purposes of reference only, and thus is not intended to be limiting. For example, terms such as "upper", "lower", "above", "below", "clockwise", and "counterclockwise" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to a controller, computer or processor or its equivalent can be understood to include one or more computational devices including microprocessors, field programmable gate arrays, and application specific integrated circuits that can implement state aware logic and that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

We claim:

1. A gateway for connecting a device level ring (DLR) network to a spanning tree (ST) network comprising:
    a first and second port connectable to devices in a DLR network to communicate an advertise message and general messages with other devices connected in the DLR network, wherein the advertise message includes a precedence value unique to the gateway;
    at least one third port connectable to devices in the ST network to communicate general messages with other devices connected in the ST network; and
    a controller communicating with the first, second, and third ports to operate in at least two states including an active state and a backup state, wherein:
    when the controller is operating in the active state, the controller transmits the advertise message and the general messages on the DLR network between the first port and the second port and transmits the general messages between the DLR network and the ST network via the at least one third port and at least one of the first port and the second port,
    when the controller is operating in the backup state, the controller listens for at least one additional advertise message generated by another gateway, transmits the general messages on the DLR network between the first port and the second port, and blocks the general between the DLR network and the ST network by blocking messages between the at least one third port and the first and second ports,
    the controller enters the active state when no additional advertise message is received within a predetermined time or when the precedence value for the gateway has a higher precedence than the precedence value of another gateway received in any additional advertise message, and
    the controller enters the backup state when the precedence value for the gateway has a lower precedence than the in any additional advertise message received.

2. The gateway of claim 1 wherein the gateway further monitors the DLR network to switch between the active and backup states based on the additional advertise messages of another gateway in the DLR network so that there is only one active gateway in the DLR network.

3. The gateway of claim 1 wherein the precedence value includes a stored value set by a user and a MAC address of the gateway.

4. The gateway of claim 1 wherein the controller is further configured to operate in a listen state, and wherein the gateway switches from the listen state to the backup state if one of the additional advertise messages is received with a higher precedence than the precedence value unique to the gateway and switches from the backup state to the listen state if one of the additional advertise messages is not received during a predetermined time or is received with a fault indication; and wherein the gateway transmits advertise messages in the listen state and not in the backup state.

5. The gateway of claim 1 wherein the gateway transmits a flush tables message to other devices on the DLR network causing them to relearn associations between addresses and ports when the gateway switches to the active state.

6. The gateway of claim 5 wherein the gateway further transmits a learning update message and causes other devices on the DLR network to transmit learning update messages upon reception of the flush tables message, causing the devices on both the DLR network and the ST network to rapidly relearn associations between addresses and ports when the gateway switches to the active state.

7. The gateway of claim 1 wherein the DLR network is an IEEE 802.3 Ethernet ring topology.

8. The gateway of claim 1 wherein the controller is configured as a supervisory node in the DLR network.

9. The gateway of claim 1 including at least two third ports, wherein when the controller is operating in the backup state the controller transmits general messages on the ST network between each of the two third ports.

10. A device level ring (DLR) network comprising:
    a plurality of switching nodes arranged to forward data frames between ports based on dynamically learned MAC address routing tables, each switching device having at least a first and second port connectable to network media, the switching nodes arranged in a ring wherein the first and second ports of each switching device connect to different switching nodes of the ring and wherein at least one of the switching nodes is an active ring supervisor controllably blocking and unblocking a passage of data frames between its ports in response to continuity in the ring,
    wherein at least two of the switching nodes are gateways to another network the gateways comprising:
    a first and second port connectable to devices in the DLR network to communicate an advertise message and general messages with other devices connected in the DLR network, the wherein the advertise message includes a precedence value unique to the gateway;
    at least one third port connectable to devices in the other network to communicate general messages with other devices connected in the other network; and
    a controller communicating with the first, second, and third ports to operate in at least two states including an active state and a backup state, wherein:
    when the controller is operating in the active state, the controller transmits the advertise message and the general messages on the DLR network between the first port and the second port and transmits the general messages between the at least one third port and at least one of the first port and the second port, when the controller is operating in the backup state, the controller listens for at least one additional advertise message generated by another gateway, transmits the general messages on the DLR network between the first port and the second port, and blocks the general messages between the DLR network and the ST network by blocking messages between the at least one third port and the first and second ports, the controller enters the active state when no additional advertise message is received within a predetermined time or when the precedence value for the gateway has a higher precedence than the precedence value of another gateway received in any additional advertise message, and the controller enters the backup state when the precedence value for the gateway has a lower precedence than the precedence value in any additional advertise message received; and wherein one gateway communicates with the other gateway so that only one gateway is in the active state.

11. The DLR network of claim 10 wherein one of the switching nodes which are gateways are further configured as a supervisory node in the DLR network.

12. A method of connecting a device level ring (DLR) network to a spanning tree (ST) network comprising:

providing a gateway device having a first and second port connected to devices in a DLR network to communicate an advertise message and general messages with other devices connected in the DLR network, wherein the advertise message includes a precedence value unique to the gateway; the gateway device further having at least one third port connectable to devices in the ST network to communicate general messages with other devices connected in the ST network;

controlling the gateway to operate in at least two states including an active state and a backup state;

transmitting the advertise message and the general messages on the DLR network between the first port and the second port in the active state;

transmitting the general messages between the DLR network and the ST network via the at least one third port and at least one of the first and second port in the active state;

listening for at least one additional advertise message received at the gateway device from another gateway device;

transmitting the general messages on the DLR network between the first port and the second port in the backup state;

blocking the messages between the DLR network and the ST network by blocking messages between the at least one third port and the first and second ports in the backup state;

switching the gateway device to the active state when no additional advertise message is received within a predetermined time or when the precedence value for the gateway has a higher precedence than the precedence value of another gateway received in any additional advertise message, and switching the gateway device to the backup state when the precedence value for the gateway has a lower precedence than the precedence value in any additional advertise message received.

13. The method of claim 12 further comprising the step of monitoring the DLR network to switch between the active and backup states based on the additional advertise messages of another gateway in the DLR network so that there is only one active gateway in the DLR network.

14. The method of claim 12 wherein the precedence value includes a stored value set by a user and a MAC address of the gateway.

15. The method of claim 12 wherein the gateway states include a listen state and a backup state, and wherein the gateway switches from the listen state to the backup state if advertise messages are received with a higher precedence than the precedence value unique to the gateway and switches from the backup state to the listen state if advertise messages are not received during a predetermined time or are received with a fault indication; and wherein the gateway transmits advertise messages in the listen state and not in the backup state.

16. The method of claim 12 further comprising the step of transmitting a flush tables message to other devices on the DLR network causing them to relearn associations between addresses and ports when the gateway switches to the active state.

17. The method of claim 12 further comprising the steps of transmitting a learning update message; and causing the devices on both the DLR network and the ST network to rapidly relearn associations between addresses and ports when the gateway switches to the active state.

18. The method of claim 12 wherein the DLR network is an IEEE 802.3 Ethernet ring topology.

* * * * *

UNITED STATES PATENT AND TRADEMARK OFFICE
CERTIFICATE OF CORRECTION

| | | |
|---|---|---|
| PATENT NO. | : 9,100,210 B2 | Page 1 of 1 |
| APPLICATION NO. | : 13/296872 | |
| DATED | : August 4, 2015 | |
| INVENTOR(S) | : Sivaram Balasubramanian et al. | |

It is certified that error appears in the above-identified patent and that said Letters Patent is hereby corrected as shown below:

In the claims,

IN CLAIM 1:
(Col. 8, lines 1-3) Insert --precedence value-- as shown: "the controller enters the backup state when the precedence value for the gateway has a lower precedence than the precedence value in any additional advertise message received."

Signed and Sealed this
Twelfth Day of January, 2016

Michelle K. Lee
*Director of the United States Patent and Trademark Office*